(12) United States Patent
Eberlein et al.

(10) Patent No.: US 11,463,309 B1
(45) Date of Patent: Oct. 4, 2022

(54) AUTOMATED SERVICE INTEGRATION IN SERVICE MESHES

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/395,654

(22) Filed: Aug. 6, 2021

(51) Int. Cl.
| | |
|---|---|
| *G06F 15/177* | (2006.01) |
| *H04L 41/0813* | (2022.01) |
| *H04L 41/0893* | (2022.01) |
| *H04L 41/5054* | (2022.01) |
| *H04L 41/5041* | (2022.01) |
| *H04L 41/08* | (2022.01) |
| *H04L 67/51* | (2022.01) |

(52) U.S. Cl.
CPC ...... *H04L 41/0813* (2013.01); *H04L 41/0883* (2013.01); *H04L 41/0893* (2013.01); *H04L 41/5048* (2013.01); *H04L 41/5054* (2013.01); *H04L 67/51* (2022.05)

(58) Field of Classification Search
CPC . H04L 41/5009; H04L 43/06; H04L 43/0882; H04L 67/146; H04L 67/16; G06F 16/2379; G06F 9/541
USPC .................................................. 709/221, 203
See application file for complete search history.

(56) References Cited

U.S. PATENT DOCUMENTS

| | | | | |
|---|---|---|---|---|
| 8,943,515 | B2 * | 1/2015 | Reissman | G06F 9/543 715/769 |
| 9,514,492 | B2 * | 12/2016 | Aiglstorfer | G06Q 40/00 |
| 10,984,179 | B2 * | 4/2021 | Dart | G06T 13/80 |
| 11,321,153 | B1 * | 5/2022 | Kwatra | G06F 7/26 |

OTHER PUBLICATIONS

U.S. Appl. No. 17/231,076, filed Apr. 15, 2021, Eberlein et al.
Ives et al., "Interactive data integration through smart copy & paste." arXiv preprint arXiv:0909.1769, Sep. 2009, 10 pages.
Microsoft.com [online], "Clipboard Formats" May 2018, [retrieved on Jul. 21, 2021], retrieved from: URL <https://docs.microsoft.com/en-us/windows/win32/dataxchg/clipboard-formats#registered-clipboard-formats>, 6 pages.

* cited by examiner

*Primary Examiner* — Duyen M Doan
(74) *Attorney, Agent, or Firm* — Fish & Richardson P.C.

(57) ABSTRACT

Methods, systems, and computer-readable storage media for receiving, by an IEE and from a target service, user action metadata and target information, the user action metadata representing an action of a user to the target service, determining that an integration recommendation is to be issued to the source service at least partially in response to the user action metadata, the integration recommendation recommending a service integration of the target service with the source service; and automatically executing, by the IEE, integration of the target service with the source service by calling an extension framework to generate an extension, the extension being installed in the source service, and calling a configuration framework to configure the source service having the extension installed therein, wherein, in response to the service integration, a user interface of the source service is populated with one or more fields of a user interface of the target service.

20 Claims, 7 Drawing Sheets

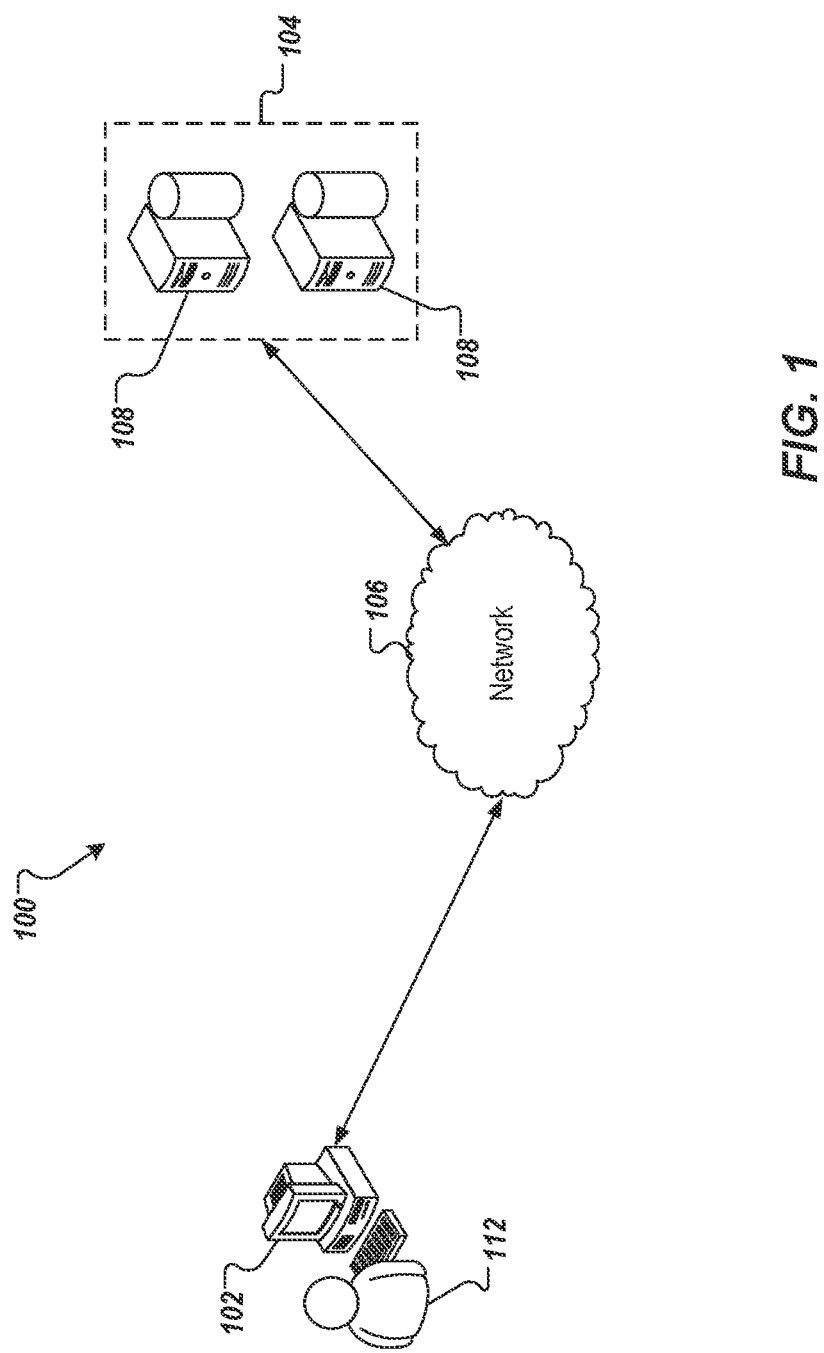

AUTOMATED SERVICE INTEGRATION IN SERVICE MESHES

BACKGROUND

Enterprise applications may be architected as distributed applications that leverage a mesh of software services called a service mesh. In such applications, each service is an independent software component that includes code and data used to execute complete and discrete functionality (e.g., record error logs). Services use common interface standards and can be communicated with over a network (e.g., Internet) using standard communication protocols. The services in a service mesh may be deployed on-premise and/or in the cloud. A service can be integrated into another service, which can be referred to as service integration. For example, a first service can consume data and/or functionality of a second service. Consequently, the second service can be integrated into the first service to provide, for example, a user interface (UI) of the second service within that of the first service and to enable automatic communication between the first service and the second service.

In some instances, services offered by a software vendor typically have pre-defined integration scenarios. In some examples, an integration scenario is a service integration that provides a desired combination of functionality and/or data of different services. Typically, pre-defined integration scenarios are provided by the software vendor in response to an analysis of common needs (e.g., among customers of the software vendor), competitive offerings, and/or product strategy considerations. While a number of service integrations can be pre-defined, not all combinations of service integrations can be contemplated and, in any case, may be impractical to pre-define given technical constraints. For example, some service integrations are not of broad interest to consumers of a service-based application, such that the technical expenditures in generating the service integrations are not worthwhile. In any case, it is infeasible to provide all potential integrations due to the exponential number of possible service integrations and overwhelming consumers to find the service integrations they need among so many theoretically possible service integrations.

On the consumer side, if consumers want to implement their own particular service integrations that are absent from the pre-defined service integrations, manual work and technical expense of the consumers are required. For example, the user interfaces (UIs) of multiple, non-integrated services are used independently and common data is written to each UI and/or is copied from one UI to another by the consumer. This not only reduces the overall perception of integration and user-friendliness; it increases consumption of technical resources. For example, a respective, independent session is required for each service and actions of copying and pasting data consume technical resources (e.g., memory, processing, bandwidth). Further, while a consumer may want to implement their own service integrations, this is a lengthy and costly process, in terms of technical resources, that can only be done by information technology (IT) integration experts.

SUMMARY

Implementations of the present disclosure are directed to a service integration platform to automatically identify and suggest service integrations and to automatically integrate services. More particularly, implementations of the present disclosure are directed to a service integration platform that monitors user actions to detect potential integration of services, suggest a service integration to a user, and to automatically integrate the services.

In some implementations, actions include receiving, by an integration extension engine (IEE) and from a target service, user action metadata and target information, the user action metadata representing an action of a user to the target service, determining, by the IEE, that an integration recommendation is to be issued to the source service at least partially in response to the user action metadata, the integration recommendation recommending a service integration of the target service with the source service; and automatically executing, by the IEE, integration of the target service with the source service by calling an extension framework to generate an extension, the extension being installed in the source service, and calling a configuration framework to configure the source service having the extension installed therein, wherein, in response to the service integration, a user interface of the source service is populated with one or more fields of a user interface of the target service. Other implementations of this aspect include corresponding systems, apparatus, and computer programs, configured to perform the actions of the methods, encoded on computer storage devices.

These and other implementations can each optionally include one or more of the following features: the action of the user includes a paste action executed to paste data for processing by the target service, the data being copied from the user interface of the source service; at least a portion of the user action metadata includes a user identifier that identifies the user, a service identifier that identifies the source service, and at least a portion of the target information comprises a service identifier that identifies the target service; determining, by the IEE, that an integration recommendation is to be issued to the source service at least partially in response to the user action metadata includes processing at least a portion of the user action metadata through a set of rules that comprises one or more of a rule that triggers an integration recommendation in response to the user executing a number of actions that exceeds a threshold number, a rule that triggers an integration recommendation in response to the user executing a number of that exceeds a threshold number within a given timeframe, and a rule that triggers an integration recommendation in response to determining that the integration had not been previously presented to the user; actions further include notifying the user of the integration recommendation, and receiving, by the IEE, user input indicating acceptance of the integration recommendation, wherein automatically executing, by the IEE, integration of the target service with the source service is in response to the user input; actions further include notifying a set of users of the integration recommendation, the user being included in the set of users; and, in response to the service integration, the one or more fields of the user interface of the target service are automatically populated with data provided by the source service.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 1 depicts an example architecture that can be used to execute implementations of the present disclosure.

Like reference symbols in the various drawings indicate like elements.

DETAILED DESCRIPTION

Figure 2A:
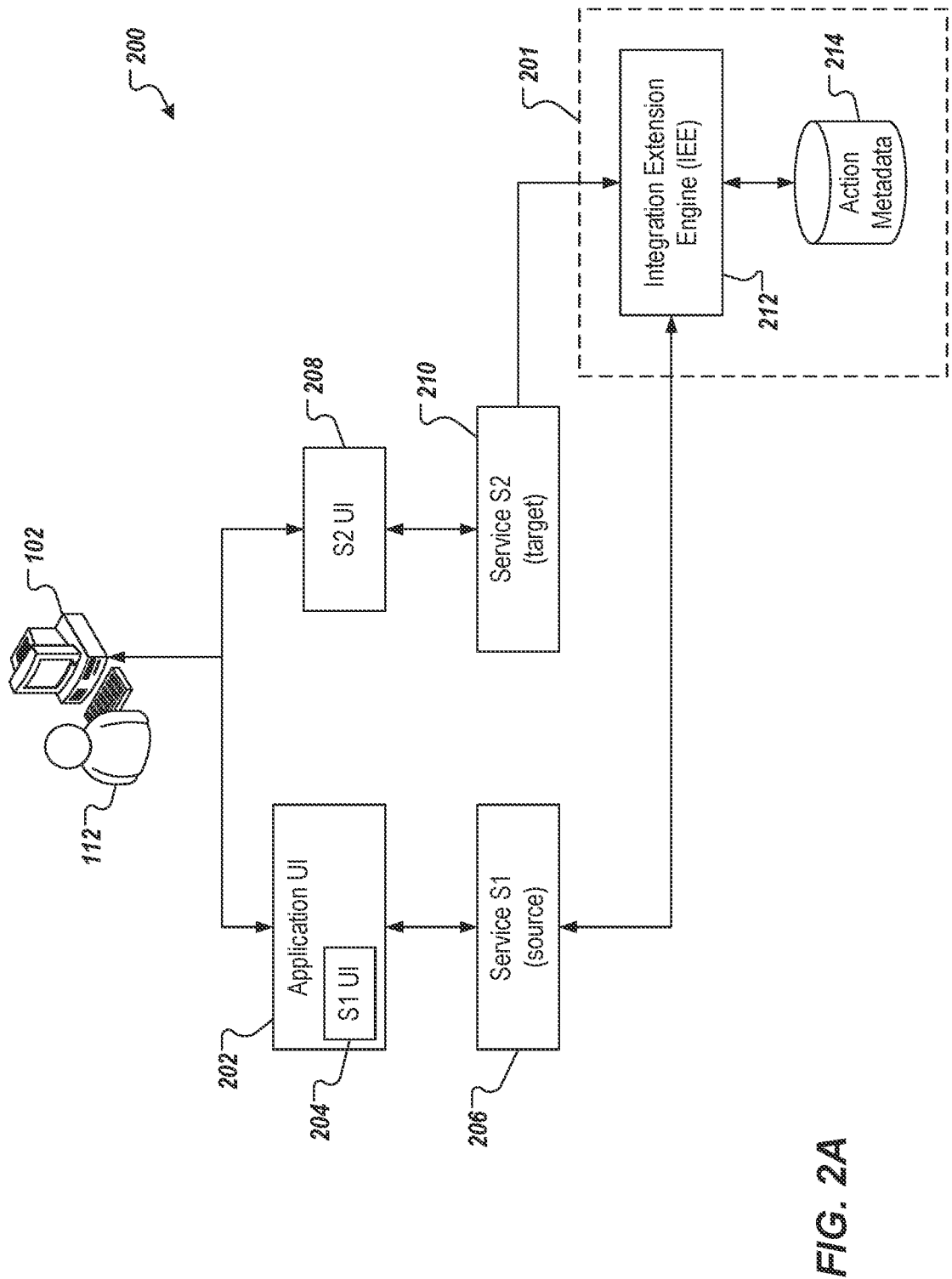
FIG. 2A depicts an example conceptual architecture in accordance with implementations of the present disclosure.

Implementations of the present disclosure are directed to a service integration platform to automatically identify and suggest service integrations and to automatically integrate services. More particularly, implementations of the present disclosure are directed to a service integration platform that monitors user actions to detect potential integration of services, suggest a service integration to a user, and to automatically integrate the services. In some examples, integration of the services results in a user interface (UI) of a first service having at least a portion of a UI of a second service integrated therein, and an extension being provided in the first service to enable direct communication between the first service and the second service. As described in further detail herein, the service integration of the present disclosure can be described as a no-code approach, in which services are integrated without coding being generated by a consumer (e.g., user) of the services and reduced consumption of technical resources relative to manually providing the service integration.

Implementations can include actions of receiving, by an integration extension engine (IEE) and from a target service, user action metadata and target information, the user action metadata representing an action of a user to the target service, determining, by the IEE, that an integration recommendation is to be issued to the source service at least partially in response to the user action metadata, the integration recommendation recommending a service integration of the target service with the source service; and automatically executing, by the IEE, integration of the target service with the source service by calling an extension framework to generate an extension, the extension being installed in the source service, and calling a configuration framework to configure the source service having the extension installed therein, wherein, in response to the service integration, a user interface of the source service is populated with one or more fields of a user interface of the target service.

To provide further context for implementations of the present disclosure, and as introduced above, enterprise applications may be architected as distributed applications that leverage a mesh of software services called a service mesh. In such service-based applications, one or more services can be integrated into another service, which can be referred to as service integration. For example, a first service can consume data and/or functionality of a second service. Consequently, the second service can be integrated into the first service to provide, for example, a UI of the second service within that of the first service and to enable automatic communication between the first service and the second service.

In some instances, services offered by a software vendor typically have pre-defined integration scenarios. In some examples, an integration scenario is a service integration that provides a desired combination of functionality and/or data of different services. Typically, pre-defined integration scenarios are provided by the software vendor in response to an analysis of common needs (e.g., among customers of the software vendor), competitive offerings, and/or product strategy considerations. While a number of service integrations can be pre-defined, not all combinations of service integrations can be contemplated and, in any case, may be impractical to pre-define given technical constraints. For example, some service integrations are not of broad interest to consumers of a service-based application, such that the technical expenditures in generating the service integrations are not worthwhile. In any case, it is infeasible to provide all potential integrations due to the exponential number of possible service integrations and overwhelming consumers to find the service integrations they need among so many theoretically possible service integrations.

On the consumer side, if consumers want to implement their own particular service integrations that are absent from the pre-defined service integrations, manual work and technical expense of the consumers are required. For example, the user interfaces (UIs) of multiple, non-integrated services are used independently and common data is written to each UI and/or is copied from one UI to another by the consumer. This not only reduces the overall perception of integration and user-friendliness; it increases consumption of technical resources. For example, a respective, independent session is required for each service and actions of copying and pasting data consume technical resources (e.g., memory, processing, bandwidth). Further, while a consumer may want to implement their own service integrations, this is a lengthy and costly process, in terms of technical resources, that can only be done by information technology (IT) integration experts.

In view of the above context, implementations of the present disclosure provide a service integration platform that monitors user actions to detect potential integration of services, suggest a service integration to a user, and to automatically integrate the services. The service integration of the present disclosure can be described as a no-code approach, in which services are integrated without coding being created by a consumer (e.g., user) of the services and reduced consumption of technical resources relative to manually providing the service integration (e.g., through coding by an IT integration expert).

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In some implementations, the server system 104 hosts a set of services, each service is an independent software component that includes code and data used to execute complete and discrete functionality (e.g., record error logs). Services use common interface standards and can be communicated with over a network (e.g., Internet) using standard communication protocols. In some examples, the user 112 interacts with multiple services through the client device 102. For example, the user 112 can interact with a first service through a first UI that is displayed by the client device 102 and can interact with a second service through a second UI that is displayed by the client device 102. In some examples, the first service and the second service are not integrated and the user 112 interacts with the first service and the second service as independent services.

In accordance with implementations of the present disclosure, the server system 104 can host a service integration platform to automatically identify and suggest service integrations and to automatically integrate services. For example, and as described in further detail herein, the service integration platform monitors interactions of the user 112 with the first service and the second service and, in response to one or more interactions, also referred to herein as user actions, the service integration platform recommends a service integration to integrate the first service and the second service. In some examples, in response to user acceptance of the service integration, the service integration platform automatically executes integration of the first service and the second service. In some examples, and as described in further detail herein, integration of the services results in a UI of a first service having at least a portion of a UI of a second service integrated therein, and an extension being provided in the first service to enable direct communication between the first service and the second service.

FIG. 2A depicts an example conceptual architecture 200 in accordance with implementations of the present disclosure. The example conceptual architecture 200 is representative of a service-based application that leverages functionality of one or more services in the execution of one or more processes. In the example of FIG. 2, the example conceptual architecture 200 includes a service integration platform 201, an application user interface (UI) 202, a first service UI 204, a first service 206, a second service UI 208, and a second service 210. In accordance with implementations of the present disclosure, the service integration platform 201 includes an IEE 212 and an action metadata store 214. As described in further detail herein, the IEE 212 is responsive to user actions to the second service 210 from the application UI 202 to trigger automated service integration.

In further detail, the application UI 202 enables users, such as the user 112, to interact with a service-based application through a computing device, such as the computing device 102. In the example of FIG. 2A, the service-based application leverages functionality of the first service 206. For example, the application UI 202 includes the first service UI 204, which enables the user 112 to directly input data to and/or receive data from the first service 206. In the example of FIG. 2A, the user 112 interacts with the second service 210 through the second service UI 208. In some examples, the user 112 establishes a first session with the first service 206 and a second session with the second service 210, the first session being separate and distinct from the second session. In some examples, the first session and the second session are separately authenticated. In some examples, single-sign on (SSO) is configured, such that a shared security session is established by the browser with an identity management system, which is also used to log onto the second session. In the depicted scenario, the second service 210 is not integrated with the service-based application. For example, for certain functionality that the second service 210 provides, data from the first service 206 is required. Here, the first service 206 can be referred to as a source, because the first service 206 is the source of the data, and the second service 210 can be referred to as the target, because the second service 210 is to consume the data of the first service 206.

The user 112 retrieves the data from the first service 206 through the first service UI 204. In some examples, the data is displayed in the first service UI 204, but the user 112 needs to perform some action to make the data available for use within the second service UI 202. For example, the user 112 can view the data displayed in the first service UI 204 and re-type the data into the second service UI 208. More commonly, however, users execute a copy action (or cut action) and a paste action for semi-automated copying of the data from one UI to another UI, in this case, from the application UI 202 (the first service UI 204) to the second service UI 208. In this manner, typographical errors that typically occur with re-typing data can be avoided and completeness of the data can be ensured.

In accordance with implementations of the present disclosure, and as described in further detail herein, actions that are executed to copy data provided from a source (e.g., the first service 206) and paste data to a target (e.g., the second service 210) can trigger automated service integration. For example, and as depicted in FIG. 2A, the second service 210 is not integrated with the service-based application. Instead, the user 112 interacts with the second service 210 in parallel with interacting with the first service 206. In response to action of the user 112 (e.g., pasting data into the second service UI 208), the IEE 212 is triggered to suggest that the second service 210 be integrated and, pending approval of the user 112, automatically execute the service integration.

In further detail, in response to the action of the user to the second service UI 208, the second service 210 notifies the IEE 212. For example, the second service 210 includes functionality that is responsive to the paste action to send action data representative of the paste action to the IEE 212. In some examples, the data pasted into the second service UI 208 (the pasted data) is associated with metadata that identifies the first service 206 as the source of the data. The second service 210 can include an application programming interface (API) end-point that can be used to automatically call the code behind the screen (e.g., the Open Data Protocol (oData) API used by the second service UI 208).

In further detail, when the data is copied, the application UI 202 (the first service UI 204) is configured to provide a data set that includes the data and metadata that represents the first service 206 as the source of the data. In some examples, the first service UI 204 interacts with a clipboard function of an operating system (OS) executed by the client device 102. In some examples, the clipboard function enables selection of metadata to include with any data that is copied to the clipboard, which metadata can be read by a target service (if so configured) as described in further detail herein. In some examples, the metadata can include, without limitation, a data structure of the data, a path to the data (e.g., a uniform resource locator (URL) of the date) and a location of the first service 206, which the data is copied from (e.g., a URL of the first service 206). More particularly, the metadata can include a data model of the data, field-name(s) (e.g., of field(s), from which the data is copied), field-data-type(s), type of data object (DO) node (e.g., DO-node-type), and the selected data key (e.g., universally unique identifier (GUID) of the DO (DO-ID), set of key fields). In some examples, the data set also includes an identifier of the user (user-id) and an identifier of the first service 206 (service-id). The second service UI 208 is configured to be responsive to data sets that include such metadata. In some examples, in response to the data set being pasted into the second service UI 208, the second service UI 208 is configured to determine that the data is associated with metadata, extracts the metadata, and stores the metadata. However, only the data that is copied from the first service UI 204 is pasted into respective fields of the second service UI 208 (i.e., the metadata is not pasted into any fields of the second service UI 208).

In this example, the first service 206, and thus, the first service UI 204, and the second service 210, and thus, the second service UI 208 are configured for automated service integration of the present disclosure. If the data is copied from a service UI that is not configured for automated service integration, metadata as described herein is not included in a data set with the data. If the data is pasted into a service UI of a service that is not configured for automated service integration, the metadata, if any, is ignored and data is pasted into respective fields of the service UI.

In some implementations, the second service 210 receives the metadata and transmits the metadata and information on the paste target to the IEE 212. In some examples, the paste target is the second service UI 208 and/or the second service 210 or portions of each. In some examples, the information on the paste target includes, without limitation, the user-id, the service-id of the second service 210, associated API/screen to call, and timestamp of paste action. In some examples, the second service 210 provides a data set that includes the metadata, the user-id, and the service-id resulting from the copy action within the first service UI 204, and the paste information resulting from the paste action within the second service UI 208.

In some implementations, the IEE 212 receives the data set from the second service 210 and processes the data set to determine whether an integration recommendation is to be provided. In some examples, the IEE 212 can execute a set of rules that define circumstances, under which an integration recommendation is to be provided. For example, the set of rules can include a rule that triggers an integration recommendation in response to a user executing a number of copy-paste-actions that exceeds a threshold number. As another example, the set of rules can include a rule that triggers an integration recommendation in response to a user executing a number of copy-paste-actions that exceeds a threshold number within a given timeframe (e.g., a session, X minutes within a session). In some examples, the set of rules can include a rule that triggers an integration recommendation in response to determining that the integration had not been previously presented to the same user (e.g., at all, within a threshold time since an integration recommendation had been made).

In some examples, one or more rules can also determine whether the received metadata is sufficient to actually generate an integration (e.g. that an API is provided, the URL to call is provided, metadata is sufficient to compute data extraction and mapping to the API demands). In some examples, the metadata is determined to be sufficient, if it includes at least user-id, DO-ID, field name of the DO displayed in the field of the US, and the API of the service to call to read the DO.

In some implementations, copy-paste actions of multiple users can be taken into consideration in determining whether to recommend a service integration. For example, copy-paste actions are recorded for multiple users across multiple source UIs and target UIs. For a given target UI (e.g., the second service UI 208), the paste-actions are evaluated to compute a superset of fields copied per source UI (e.g., the first service UI 204). Upon recommending a service integration, the superset of fields is shown in the recommendation, and which fields to pre-fill. In some examples, additional information can provided with the recommendation (e.g., how often each field had been copied by users in the user group). In some examples, a ranking can be provided for each field. For example, priority 1—personally used by the user that the integration recommendation was triggered for, priority 2—frequently used often (by many users), and priority 3—not used often (e.g. because too short and can quickly be typed) but data type and domain matches (e.g. paste from factory ID to factory ID).

Figure 3:
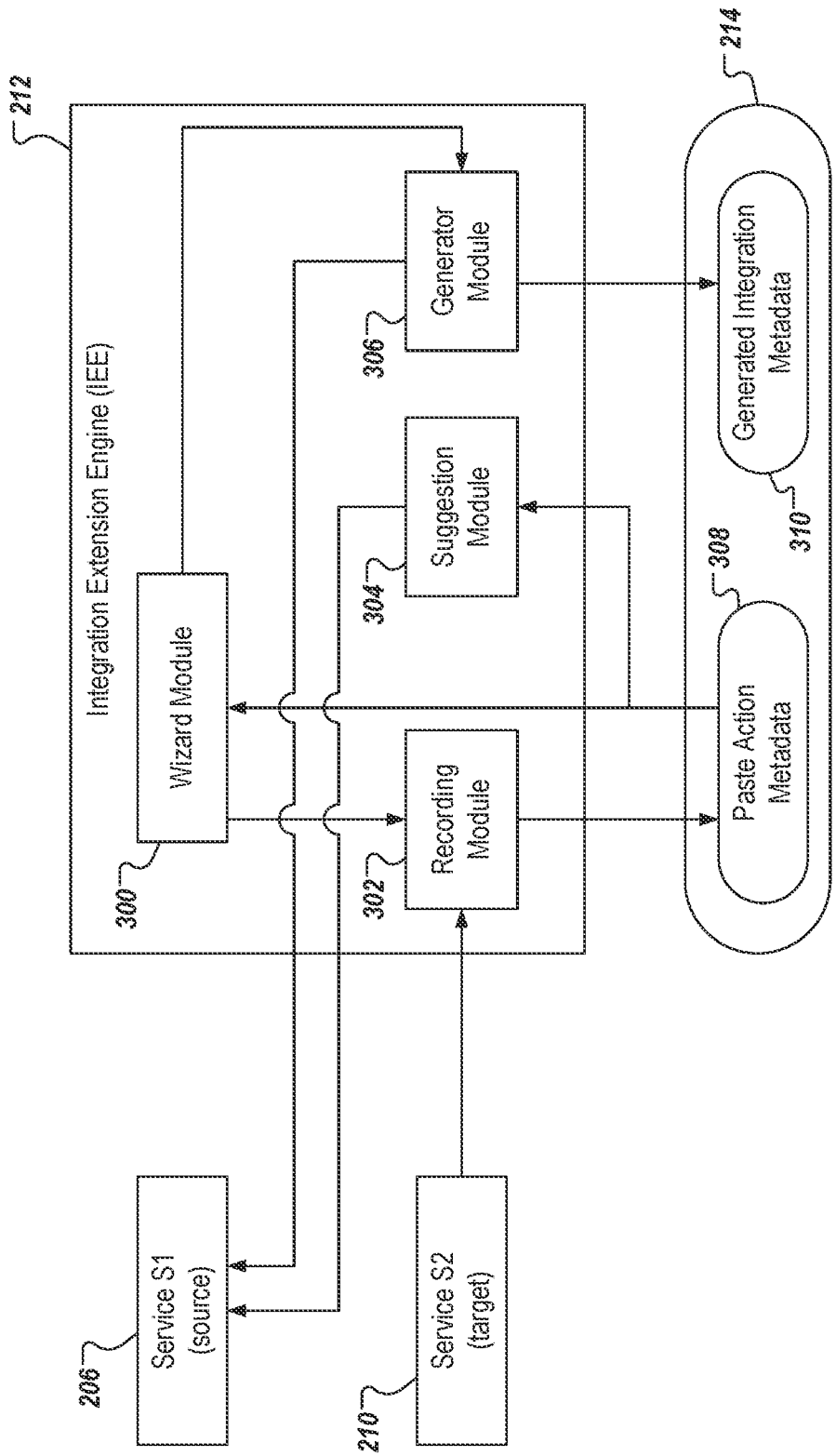
FIG. 3 depicts details of an integration extension engine (IEE) in accordance with implementations of the present disclosure.

FIG. 3 depicts details of the IEE 212 in accordance with implementations of the present disclosure. In the example of FIG. 3, the IEE 212 includes a wizard module 300, a recording module 302, a suggestion module 304, and a generator module 306. In some examples, each of the wizard module 300, the recording module 302, the suggestion module 304, and the generator module 306 is provided as one or more computer-executable programs executed by one or more computing devices (e.g., servers). In the example of FIG. 3, the action metadata store 214 is depicted and includes a paste action metadata store 308 and a generated integration metadata store 310.

As described in further detail herein, the IEE 212 records user copy-paste actions by being notified by a target service (e.g., the second service 210), in instances where a user pastes data that had been copied from a source service (e.g., the first service 206). In response to a set of copy-paste actions, as triggered by the set of rules, the IEE 212 recommends an integration and notifies the source service to bring the integration recommendation to the attention of the user. The IEE 212 supports users with a guided learning approach to capture additional fields, if any, that are to be pre-filled as part of the service integration. In response to the user accepting creation the service integration, the IEE 212 configures the service integration by, among other actions, calling existing frameworks for extension and destination management.

In further detail, the wizard module 300 is configured to provide a set of prompts (e.g., in the first service UI 204) to guide the user through the actions to specify fields that are to be pre-filled as part of the service integration. For example, a target service API (e.g., an API of the second service 210) is specified to the user. As another example, a set of recommended fields can be provided, which includes the fields of the first service UI 204, from which the user had copied data from. In some examples, a set of additional fields can be provided, which includes one or more fields of the first service UI 204, which the user had not copied data from. For example, the wizard module 300 can prompt the user to add fields by executing a copy-paste action from the first service UI 204 to the second service UI 206 in parallel with using the wizard and the IEE 212 records the newly copied fields in the set of additional fields. In some examples, a set of fields can be defined and can include the set of recommended fields and the set of additional fields, if any.

In some examples, the recording module 302 is called by target services that are configured to service integration recommendation (e.g., the second service 210). For example, the recording module 302 is called when data is pasted into a target UI (e.g., the second service UI 208) that includes metadata annotated by another instrumented service (e.g., the first service 206). In some examples, the recording module 302 stores the metadata together with the timestamp in the paste action metadata store 308.

In some examples, the suggestion module 304 is triggered in response to a new paste record being stored by the recording module 302. In some examples, the suggestion module 304 is triggered on a schedule (e.g., hourly, daily, weekly) to review paste records stored since the last trigger. In some examples, the suggestion module 304 determines whether an integration recommendation is to be made based on the set of rules, discussed herein. If the suggestion module 304 determines that an integration recommendation is to be made, the suggestion module 304 prompts the user, as described herein.

In some examples, the generator module 306 is triggered to implement the recommended integration in response to the user accepting the recommended integration. For example, the generator module 306 calls an extension framework (not depicted) that generates an extension in the source service (e.g., the first service 206) to call the target service (e.g., the second service 210) and populate the fields in the set of fields. In some examples, the extension framework automatically adds a custom field to a respective table in the database that stores the data of the DO in question. The extension framework automatically adds access code to read, write, and search data of this field by API, and extends the UI to show the custom field on the same UI as the DO that is extended. The generator module 306 calls a configuration framework (not shown) to configure the target service (e.g., the second service 210) so it can be called by the source service (e.g., the first service 206). In some examples, the configuration framework stores connection parameters (e.g., URL, authentication credentials) to a target service. The configuration framework enables a source service to connect to a target service by specifying the service name without the need to know about the connection parameters maintained by the configuration framework. The generator module 306 stores metadata representative of the generated integration in the generated integration metadata store 310.

Figure 4:
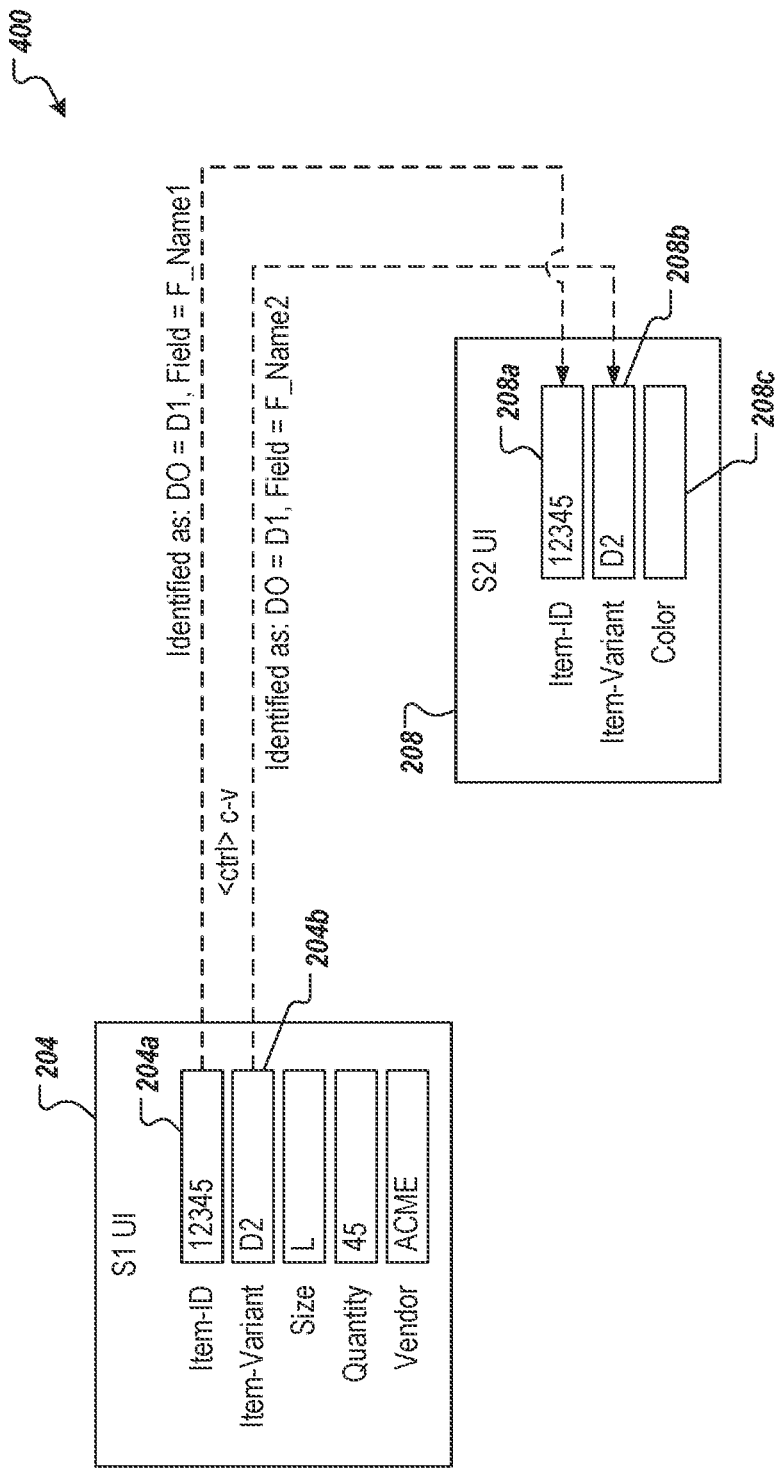
FIG. 4 depicts an example service integration trigger in accordance with implementations of the present disclosure.

FIG. 4 depicts an example service integration trigger 400 in accordance with implementations of the present disclosure. In the example of FIG. 4, example data is copied from the first service UI 204 and is pasted into the second service UI 208. More particularly, data in UI elements 204a, 204b of the first service UI 204 is copied and pasted into UI elements 208a, 208b of the second service UI 208. In this example, for each copy action, metadata is generated by the first service UI 204 (e.g., DO=D1, Field=F_Name1; DO=D1, Field=F_Name2) and is pasted to the second service UI 208 with each paste action. As described herein, the second service UI 208 parses the metadata and the data, pastes the data into the respective fields 208a, 208b, and provides the metadata to the second service 210. The second service 210 provides the metadata to the IEE 212, which selectively triggers an integration recommendation, as described herein.

In the example of FIG. 4, the integration recommendation can recommend that the fields 208a, 208b be included in the service integration, because those were the fields that the data was pasted into, which triggered the integration recommendation. In some examples, and as described above, one or more additional fields can be selected. For example, the IEE 212 can prompt the user 112 to select a field 208c to be included in the service integration.

Referring again to FIG. 2A, and in some implementations, in response to determining that a service integration is to be recommended, the IEE 212 pushes recommendation information to the source UI of the service that the user copies the data from and the source UI will notifies the user of the integration recommendation. In the example of FIG. 2A, the IEE 212 transmits recommendation information to the first service UI 204. In some examples, a notification is provided during a current session with the first service 206. In some examples, a notification is provided at the start of a next session with the first service 206. In some examples, another channel, such as a digital assistant, notifies the user of the integration recommendation. In some examples, the user can decline the integration recommendation (e.g., selecting a "not now" UI element). In some examples, the user can accept the integration recommendation (e.g., selecting an "accept" UI element).

In some implementations, in response to the user accepting the integration recommendation, a set of actions is triggered to implement the service integration. An example action can include requesting that the user enter a label, which can be used in a generated UI element to trigger a push of data from the first service 206 to the second service 210. In some examples, the user can select to add more fields of the first service UI 204 for input to the second service 210 (e.g., fields of the first service UI 204 that were not included in the copy-paste action(s) that triggered the recommendation).

In some implementations, it can be determined whether the service integration is to be implemented only for the particular user (i.e., the user that accepts the service integration) or if the service integration is to be implemented more broadly. For example, the IEE 212 can request that the user 112 specify whether the service integration is only to be used for them or is to be used more broadly. In some examples, more broadly can indicate a set of users that includes the user 112 (e.g., a user group that the user 112 is a member of).

In some implementations, to enable implementation of the service integration for a larger audience multiple approaches can be considered. For example, a set of users can be defined and can include users with roles that have read-permission in the source UI (e.g., the first service UI 204) and write-permission in the target UI (e.g., the second service UI 208). Users having both roles are candidates for use of the service integration. As another example, a set of users can be defined and can include users with roles that have read-permission in the source service (e.g., the first service 206) and write-permission in the target service (e.g., the second service 210). Users having both roles are candidates for use of the service integration. As another example, a so-called power-user of the application and related UIs (e.g., administrator) can be notified of the service integration and can determine whether to publish the service integration to all users or a sub-set of users. In some examples, if the service integration is proposed to a group of users, a notification can be provided (e.g., in source UIs of respective users). In some examples, each user can opt-in and add the service integration extension to their UI. In some examples, a default of accepting the service integration can be provided and each user can opt-out (e.g., users can remove modified source UIs by opting out).

Figure 2B:
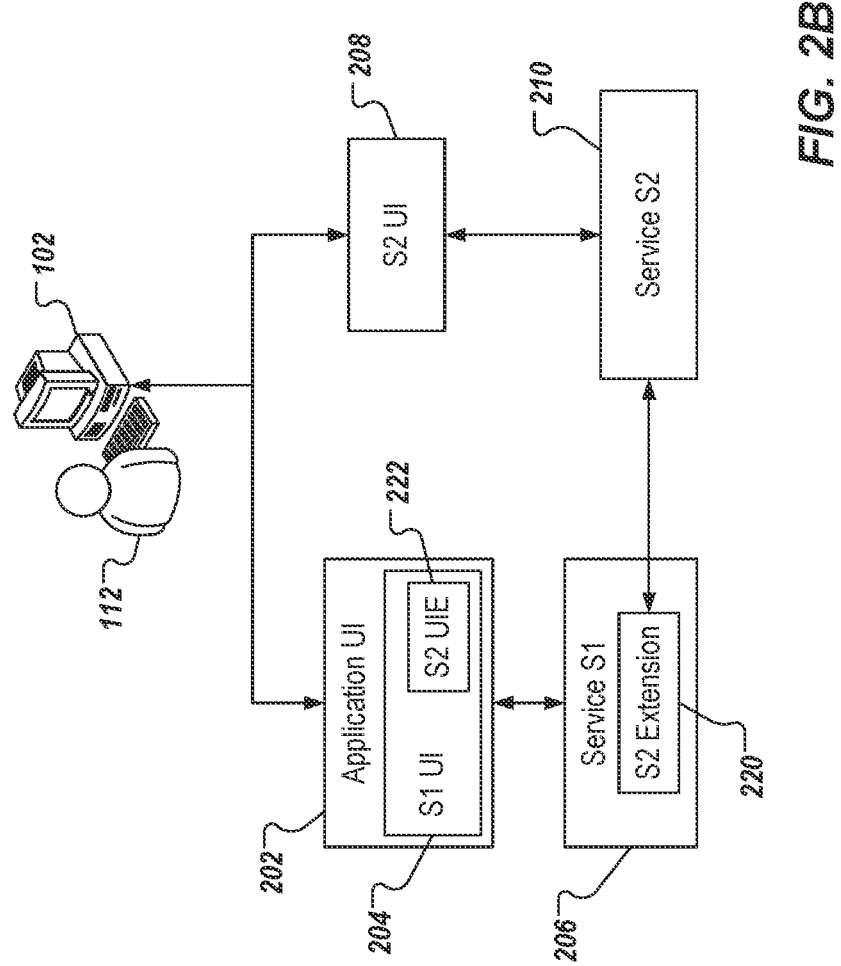
FIG. 2B depicts a modified portion of the example conceptual architecture of FIG. 2A after automated service integration in accordance with implementations of the present disclosure.

FIG. 2B depicts a modified portion of the example conceptual architecture of FIG. 2A after automated service integration in accordance with implementations of the present disclosure. In the example of FIG. 2B, an extended first service UI 204' is provided by extending the first service UI 2-4 (by the extension framework) with at least one second service UI element (UIE) 222. Further, the first service 206 includes a second service extension 220. The second service extension 220 enables direct communication between the first service 206 and the second service 210. For example, the second service extension 220 is invoked from the extended first service UI 204'. In some examples, when the user 112 clicks on the corresponding UIE that triggers the generated integration (e.g., the second service UIE 222), the second service extension 220 reads the fields that were determined relevant when the integration was created, and uses the destination framework to establish a connection to the second service 210. In some examples, the second service extension 220 invokes an API to create a DO in the second service 210 and fills in one or more fields with data read from the first service 206. The second service extension 220 navigates the user 112 to the second service UI 208 to complete data entry on the already pre-populated DO, if any. In some examples, SSO is configured across all services. Consequently, the OAuth token that was used in the first service 206 is exchanged to a token valid for the second service 210 representing the same user. For this, the destination framework was configured with credentials that are used to call the identity management system to fetch the token to be used when calling the second service 210.

Figure 5:
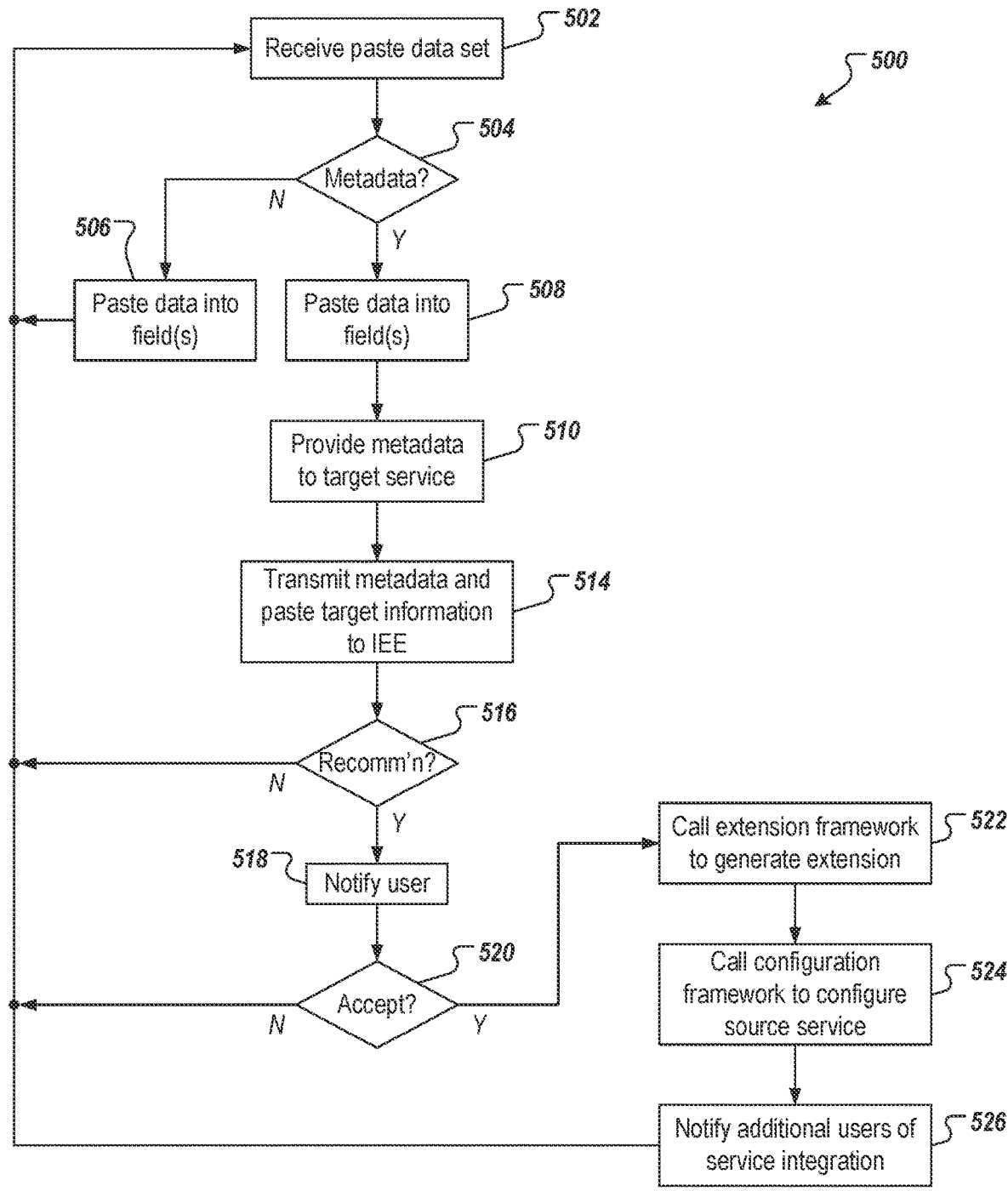
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

A paste data set is received (502). For example, and as described herein with reference to FIG. 2A, the user 112 executes a copy action (or cut action) and a paste action for semi-automated copying of the data from one UI to another UI, in this case, from the application UI 202 (the first service UI 204) to the second service UI 208. Here, the second service UI 208 receives the paste data set. When the data is copied from the first service UI 204, the application UI 202 (the first service UI 204) is configured to provide a paste data set that includes the data and metadata that represents the first service 206 as the source of the data. In some examples, the metadata can include, without limitation, a data structure of the data, a path to the data (e.g., a uniform resource locator (URL) of the date) and a location of the first service 206, which the data is copied from (e.g., a URL of the first service 206). In some examples, the paste data set also includes an identifier of the user (user-id) and an identifier of the first service 206 (service-id).

It is determined whether the paste data set includes metadata (504). For example, and as described herein, the second service UI 208 is configured to be responsive to data sets that include such metadata. In some examples, in response to the paste data set being pasted into the second service UI 208, the second service UI 208 is configured to determine whether the data is associated with metadata, and, if so, extract the metadata and store the metadata. In some examples, a paste data set does not include such metadata (e.g., in cases where the a service, from which the data is copied, is not configured to provide such metadata). If the paste dataset does not include metadata, data is pasted into respective fields (506), and the example process 500 loops back. If the paste dataset includes metadata, data is pasted into respective fields (508) and the metadata is provided to the target service (510). For example, and as described herein, only the data that is copied from the first service UI 204 is pasted into respective fields of the second service UI 208 (i.e., the metadata is not pasted into any fields of the second service UI 208).

Metadata and paste target information are transmitted to the IEE (514). For example, and as described herein, the second service 210 receives the metadata and transmits the metadata and information on the paste target (i.e., paste target information) to the IEE 212. In some examples, the paste target is the second service UI 208 and/or the second service 210 or portions of each. In some examples, the information on the paste target includes, without limitation, the user-id, the service-id of the second service 210, associated API/screen to call, and timestamp of paste action. In some examples, the second service 210 provides a data set that includes the metadata, the user-id, and the service-id resulting from the copy action within the first service UI 204, and the paste information resulting from the paste action within the second service UI 208.

It is determined whether an integration recommendation is to be made (516). For example, and as described herein, the IEE 212 receives the data set from the second service 210 and processes the data set to determine whether an integration recommendation is to be provided. In some examples, the IEE 212 can execute a set of rules that define circumstances, under which an integration recommendation is to be provided. If it is determined not to make an integration recommendation, the example process 500 loops back. If it is determined to make an integration recommendation, a user is notified (518). For example, and as described herein, the IEE 212 pushes recommendation information to the source UI of the service that the user copies the data from and the source UI will notifies the user of the integration recommendation. In some examples, a notification is provided during a current session with the first service 206. In some examples, a notification is provided at the start of a next session with the first service 206. In some examples, another channel, such as a digital assistant, notifies the user of the integration recommendation. In some examples, the user can decline the integration recommendation (e.g., selecting a "not now" UI element). In some examples, the user can accept the integration recommendation (e.g., selecting an "accept" UI element).

It is determined whether the integration recommendation is accepted (520). If the integration recommendation is not accepted, the example process 500 loops back. If the integration recommendation is accepted, an extension framework is called to generate an extension (522) and a configuration framework is called to configure the source service (524). For example, and as described herein, the generator module 306 of FIG. 3 is triggered to implement the recommended integration in response to the user accepting the recommended integration. For example, the generator module 306 calls an extension framework (not depicted) that generates an extension in the source service (e.g., the first service 206) to call the target service (e.g., the second service 210) and populate the fields in the set of fields. In some examples, the extension framework automatically adds a custom field to a respective table in the database that stores the data of the DO in question. The extension framework automatically adds access code to read, write, and search data of this field by API, and extends the UI to show the custom field on the same UI as the DO that is extended. The generator module 306 calls a configuration framework (not shown) to configure the target service (e.g., the second service 210) so it can be called by the source service (e.g., the first service 206). In some examples, the configuration framework stores connection parameters (e.g., URL, authentication credentials) to a target service. The configuration framework enables a source service to connect to a target service by specifying the service name without the need to know about the connection parameters maintained by the configuration framework.

In some examples, one or more additional users are notified of the service integration (526), and the example process 500 loops back. For example, and as described herein, it can be determined whether the service integration is to be implemented only for the particular user (i.e., the user that accepts the service integration) or if the service integration is to be implemented more broadly. For example, the IEE 212 can request that the user 112 specify whether the service integration is only to be used for them or is to be used more broadly. In some examples, more broadly can indicate a set of users that includes the user 112 (e.g., a user group that the user 112 is a member of).

Figure 6:
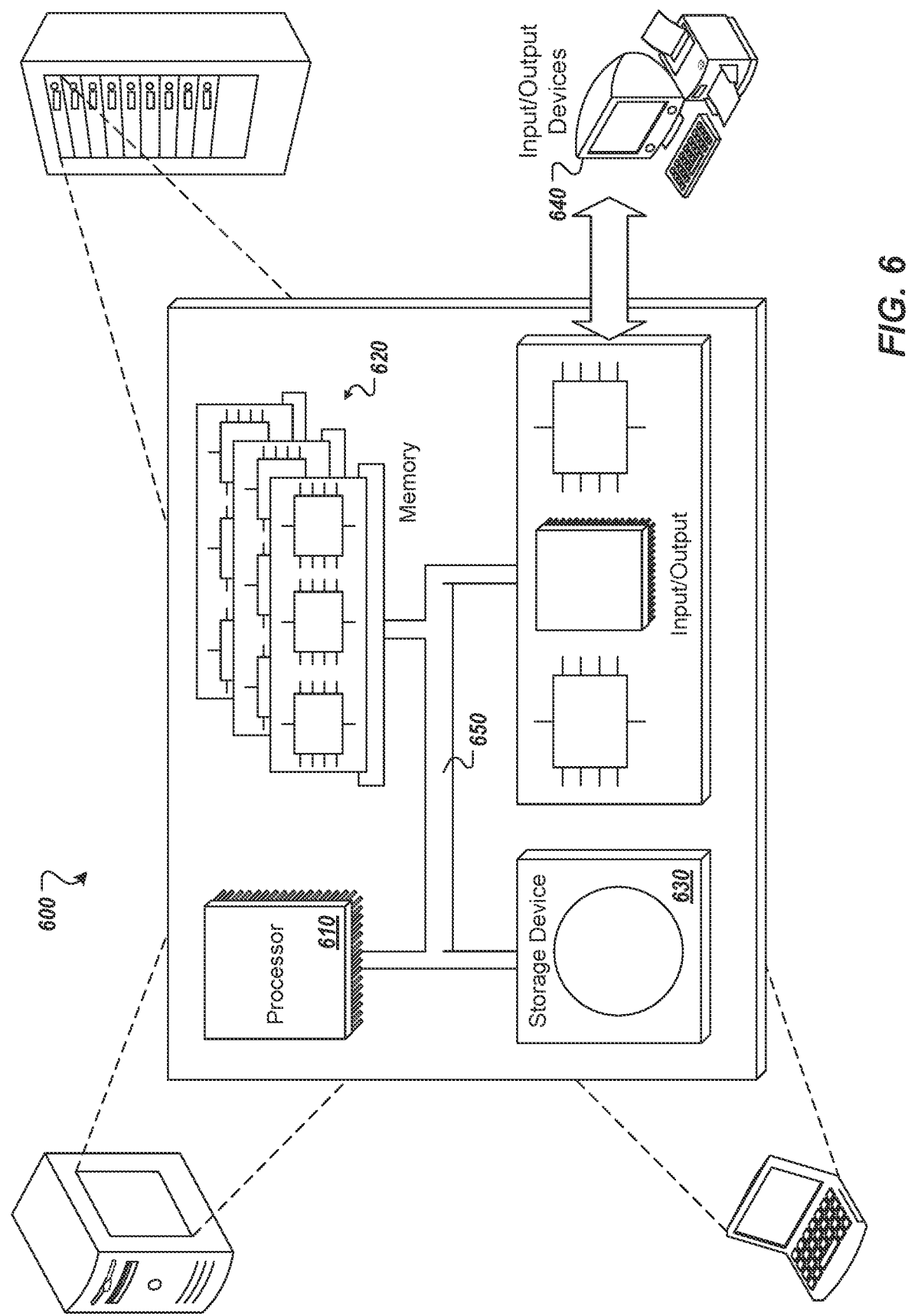
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for automatic integration of services in service-based applications, the method being executed by one or more processors and comprising:
    receiving, by an integration extension engine (IEE) and from a target service, user action metadata and target information, the user action metadata representing an action of a user to the target service, the user action metadata being provided in a data set from a source service to the target service in response to a user interface (UI) of the source service being configured to include the user action metadata in the data set for automated service integration, and being provided from the target service to the IEE in response to a UI of the target service being configured to be responsive to the user action metadata for automated service integration;
    determining, by the IEE, that an integration recommendation is to be issued to the source service at least partially in response to the user action metadata, the integration recommendation recommending a service integration of the target service with the source service; and
    automatically executing, by the IEE, integration of the target service with the source service by:
        calling an extension framework to generate an extension, the extension being installed in the source service, and
        calling a configuration framework to configure the source service having the extension installed therein;
    wherein, in response to the service integration, a user interface of the source service is populated with one or more fields of a user interface of the target service.

2. The method of claim 1, wherein the action of the user comprises a paste action executed to paste data for processing by the target service, the data being copied from the user interface of the source service.

3. The method of claim 2, wherein at least a portion of the user action metadata comprises a user identifier that identifies the user, a service identifier that identifies the source service, and at least a portion of the target information comprises a service identifier that identifies the target service.

4. The method of claim 1, wherein determining, by the IEE, that an integration recommendation is to be issued to the source service at least partially in response to the user action metadata comprises processing at least a portion of the user action metadata through a set of rules that comprises one or more of:
    a rule that triggers an integration recommendation in response to the user executing a number of actions that exceeds a threshold number;
    a rule that triggers an integration recommendation in response to the user executing a number of that exceeds a threshold number within a given timeframe, and
    a rule that triggers an integration recommendation in response to determining that the integration had not been previously presented to the user.

5. The method of claim 1, further comprising:
    notifying the user of the integration recommendation; and
    receiving, by the IEE, user input indicating acceptance of the integration recommendation, wherein automatically executing, by the IEE, integration of the target service with the source service is in response to the user input.

6. The method of claim 1, further comprising notifying a set of users of the integration recommendation, the user being included in the set of users.

7. The method of claim 1, wherein, in response to the service integration, the one or more fields of the user interface of the target service are automatically populated with data provided by the source service.

8. A non-transitory computer-readable storage medium coupled to one or more processors and having instructions stored thereon which, when executed by the one or more processors, cause the one or more processors to perform operations for automatic integration of services in service-based applications, the operations comprising:
    receiving, by an integration extension engine (IEE) and from a target service, user action metadata and target information, the user action metadata representing an action of a user to the target service, the user action metadata being provided in a data set from a source service to the target service in response to a user interface (UI) of the source service being configured to include the user action metadata in the data set for automated service integration, and being provided from the target service to the IEE in response to a UI of the target service being configured to be responsive to the user action metadata for automated service integration;
    determining, by the IEE, that an integration recommendation is to be issued to the source service at least partially in response to the user action metadata, the integration recommendation recommending a service integration of the target service with the source service; and
    automatically executing, by the IEE, integration of the target service with the source service by:
        calling an extension framework to generate an extension, the extension being installed in the source service, and calling a configuration framework to configure the source service having the extension installed therein;
wherein, in response to the service integration, a user interface of the source service is populated with one or more fields of a user interface of the target service.

9. The non-transitory computer-readable storage medium of claim 8, wherein the action of the user comprises a paste action executed to paste data for processing by the target service, the data being copied from the user interface of the source service.

10. The non-transitory computer-readable storage medium of claim 9, wherein at least a portion of the user action metadata comprises a user identifier that identifies the user, a service identifier that identifies the source service, and at least a portion of the target information comprises a service identifier that identifies the target service.

11. The non-transitory computer-readable storage medium of claim 8, wherein determining, by the IEE, that an integration recommendation is to be issued to the source service at least partially in response to the user action metadata comprises processing at least a portion of the user action metadata through a set of rules that comprises one or more of:
a rule that triggers an integration recommendation in response to the user executing a number of actions that exceeds a threshold number;
a rule that triggers an integration recommendation in response to the user executing a number of that exceeds a threshold number within a given timeframe, and
a rule that triggers an integration recommendation in response to determining that the integration had not been previously presented to the user.

12. The non-transitory computer-readable storage medium of claim 8, wherein operations further comprise:
notifying the user of the integration recommendation; and
receiving, by the IEE, user input indicating acceptance of the integration recommendation, wherein automatically executing, by the IEE, integration of the target service with the source service is in response to the user input.

13. The non-transitory computer-readable storage medium of claim 8, wherein operations further comprise notifying a set of users of the integration recommendation, the user being included in the set of users.

14. The non-transitory computer-readable storage medium of claim 8, wherein, in response to the service integration, the one or more fields of the user interface of the target service are automatically populated with data provided by the source service.

15. A system, comprising:
a computing device; and
a computer-readable storage device coupled to the computing device and having instructions stored thereon which, when executed by the computing device, cause the computing device to perform operations for automatic integration of services in service-based applications, the operations comprising:
receiving, by an integration extension engine (IEE) and from a target service, user action metadata and target information, the user action metadata representing an action of a user to the target service, the user action metadata being provided in a data set from a source service to the target service in response to a user interface (UI) of the source service being configured to include the user action metadata in the data set for automated service integration, and being provided from the target service to the IEE in response to a UI of the target service being configured to be responsive to the user action metadata for automated service integration;
determining, by the IEE, that an integration recommendation is to be issued to the source service at least partially in response to the user action metadata, the integration recommendation recommending a service integration of the target service with the source service; and
automatically executing, by the IEE, integration of the target service with the source service by:
calling an extension framework to generate an extension, the extension being installed in the source service, and
calling a configuration framework to configure the source service having the extension installed therein;
wherein, in response to the service integration, a user interface of the source service is populated with one or more fields of a user interface of the target service.

16. The system of claim 15, wherein the action of the user comprises a paste action executed to paste data for processing by the target service, the data being copied from the user interface of the source service.

17. The system of claim 16, wherein at least a portion of the user action metadata comprises a user identifier that identifies the user, a service identifier that identifies the source service, and at least a portion of the target information comprises a service identifier that identifies the target service.

18. The system of claim 15, wherein determining, by the IEE, that an integration recommendation is to be issued to the source service at least partially in response to the user action metadata comprises processing at least a portion of the user action metadata through a set of rules that comprises one or more of:
a rule that triggers an integration recommendation in response to the user executing a number of actions that exceeds a threshold number;
a rule that triggers an integration recommendation in response to the user executing a number of that exceeds a threshold number within a given timeframe, and
a rule that triggers an integration recommendation in response to determining that the integration had not been previously presented to the user.

19. The system of claim 15, wherein operations further comprise:
notifying the user of the integration recommendation; and
receiving, by the IEE, user input indicating acceptance of the integration recommendation, wherein automatically executing, by the IEE, integration of the target service with the source service is in response to the user input.

20. The system of claim 15, wherein operations further comprise notifying a set of users of the integration recommendation, the user being included in the set of users.

* * * * *